United States Patent
Sagasaki

(10) Patent No.: US 11,474,497 B2
(45) Date of Patent: Oct. 18, 2022

(54) NUMERICAL CONTROL DEVICE, MACHINE LEARNING DEVICE, AND NUMERICAL CONTROL METHOD

(71) Applicant: Mitsubishi Electric Corporation, Tokyo (JP)

(72) Inventor: Masakazu Sagasaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/620,744

(22) PCT Filed: Jun. 28, 2019

(86) PCT No.: PCT/JP2019/025986
§ 371 (c)(1),
(2) Date: Dec. 20, 2021

(87) PCT Pub. No.: WO2020/261581
PCT Pub. Date: Dec. 30, 2020

(65) Prior Publication Data
US 2022/0269241 A1    Aug. 25, 2022

(51) Int. Cl.
*G05B 19/4093* (2006.01)
*G05B 19/4155* (2006.01)
*G06N 20/00* (2019.01)

(52) U.S. Cl.
CPC ..... *G05B 19/4093* (2013.01); *G05B 19/4155* (2013.01); *G06N 20/00* (2019.01)

(58) Field of Classification Search
None
See application file for complete search history.

(56) References Cited

U.S. PATENT DOCUMENTS

| 2009/0107308 A1 | 4/2009 | Woody et al. |
| 2016/0011579 A1 | 1/2016 | Watanabe et al. |
| 2018/0299856 A1 | 10/2018 | Tanaka et al. |

FOREIGN PATENT DOCUMENTS

| JP | 2004-98230 A | 4/2004 |
| JP | 2014-54688 A | 3/2014 |
| JP | 2016-182654 A | 10/2016 |

(Continued)

OTHER PUBLICATIONS

International Search Report and Written Opinion dated Sep. 10, 2019, received for PCT Application PCT/JP2019/025986, Filed on Jun. 28, 2019, 9 pages including English Translation.

(Continued)

*Primary Examiner* — Ryan A Jarrett
(74) *Attorney, Agent, or Firm* — Xsensus LLP

(57) ABSTRACT

A numerical control device for controlling a plurality of drive shafts to drive a tool and cause the tool to cut a workpiece while vibrating the tool in a fixed vibrating direction regardless of a cutting direction, a comparison unit that compares a command value of a cutting depth with an actual value of the cutting depth based on a vibration amplitude of the drive shaft when the vibrating direction and the cutting direction are not the same as each other, the cutting depth being a difference between a position of a face to be machined of the workpiece before machining and a position of the machined face after machining; and an adjustment unit that adjusts a movement of the tool so that the actual value becomes smaller when the actual value is larger than the command value.

8 Claims, 13 Drawing Sheets

(56) References Cited

FOREIGN PATENT DOCUMENTS

| JP | 2018-181100 A | 11/2018 |
| WO | 2014/125569 A1 | 8/2014 |
| WO | 2015/140906 A1 | 9/2015 |

OTHER PUBLICATIONS

Decision to Grant dated Nov. 17, 2020, received for Japanese Application 2020-543234, 5 pages including English Translation.

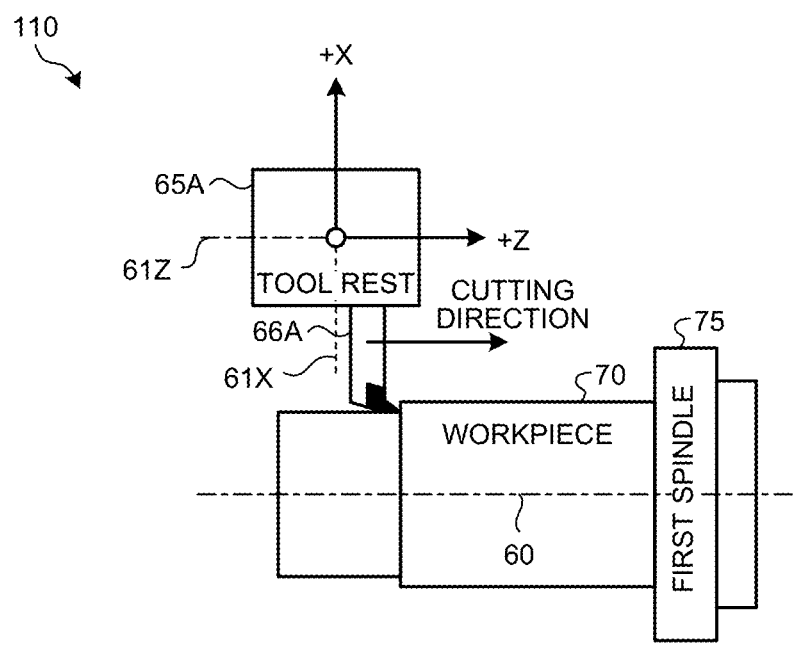

NUMERICAL CONTROL DEVICE, MACHINE LEARNING DEVICE, AND NUMERICAL CONTROL METHOD

FIELD

Cross-Reference to Related Application

The present application is based on PCT filing PCT/JP2019/025986, filed Jun. 28, 2019 the entire contents of which are incorporated herein by reference.

The present invention relates to a numerical control device, a machine learning device, and a numerical control method for controlling a machine tool for cutting a workpiece while vibrating a tool.

BACKGROUND

A numerical control device controls the operation of a tool in accordance with a machining program to make the tool process the workpiece. Some numerical control devices cause a tool to perform vibration cutting on a workpiece by vibrating the tool.

Patent Literature 1 teaches a control device that controls a machine tool for cutting a workpiece. The control device causes the machine tool to perform cutting while vibrating a tool in a machining direction.

CITATION LIST

Patent Literature

Patent Literature 1: Japanese Patent Application Laid-open No. 2018-181100

SUMMARY

Technical Problem

With the technology of related art, the processing load for vibration in a cutting direction is large. To address such a problem of the processing load, the vibrating direction may be fixed to one direction. A fixed vibrating direction, however, causes a problem in that, when the machining direction and the vibrating direction are not the same as each other, a face being machined may be cut by vibration by an amount larger than a command value of the cutting depth, which degrades the machining accuracy.

The present invention has been made in view of the above, and an object thereof is to provide a numerical control device having a vibration cutting function with a fixed vibrating direction and being capable of reducing or preventing degradation in machining accuracy.

Solution to Problem

A numerical control device according to an aspect of the present invention controls a plurality of drive shafts to drive a tool and causes the tool to cut a workpiece while vibrating the tool in a fixed vibrating direction regardless of a cutting direction, the cutting direction being a moving direction of the tool. The numerical control device includes: a matching determining unit to determine whether or not the vibrating direction and the cutting direction are the same as each other; a comparison unit to compare a command value of a cutting depth with an actual value of the cutting depth based on a vibration amplitude of one of the drive shafts when the vibrating direction and the cutting direction are not the same as each other, the cutting depth being a difference between a position of a face to be machined of the workpiece before machining and a position of the machined face after machining; and an adjustment unit to adjust a movement of the tool so that the actual value becomes smaller when the actual value is larger than the command value.

Advantageous Effects of Invention

A numerical control device according to the present invention is a numerical control device having a vibration cutting function with a fixed vibrating direction, producing an effect of enabling prevention or reduction of degradation in machining accuracy.

BRIEF DESCRIPTION OF DRAWINGS

FIG. 2 is a diagram illustrating a configuration of a machine tool to be controlled by the numerical control device illustrated in FIG. 1.

FIG. 3 is a diagram illustrating an example of a machining program to be used by the numerical control device illustrated in FIG. 1.

DESCRIPTION OF EMBODIMENTS

A numerical control device, a machine learning device, and a numerical control method according to certain embodiments of the present invention will be described in detail below with reference to the drawings. Note that the present invention is not limited to the embodiments.

First Embodiment

Figure 1:
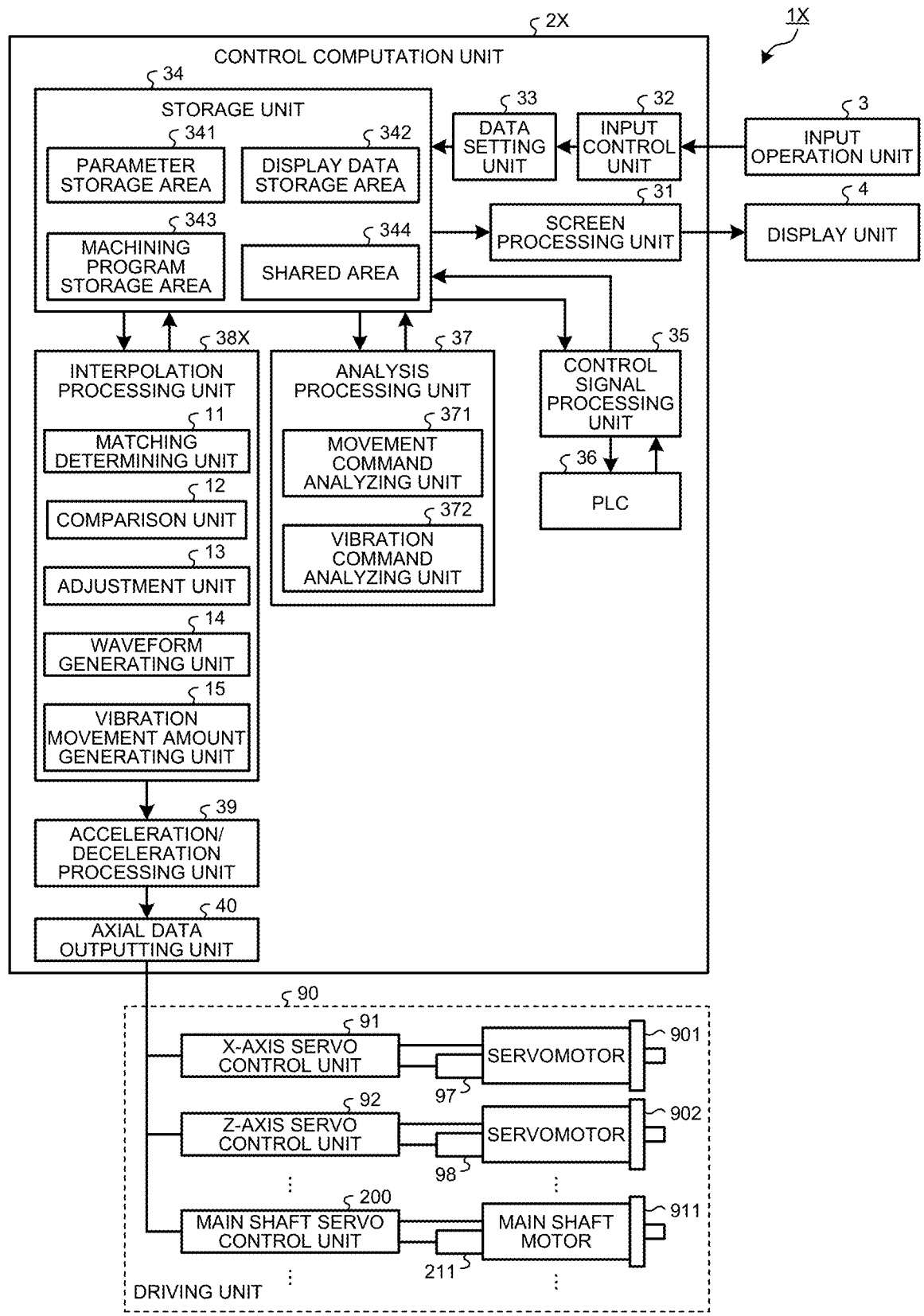
FIG. 1 is a diagram illustrating a functional configuration of a numerical control device according to a first embodiment of the present invention.

FIG. 1 is a diagram illustrating a functional configuration of a numerical control device 1X according to a first embodiment of the present invention. FIG. 2 is a diagram illustrating a configuration of a machine tool 110 to be controlled by the numerical control device 1X illustrated in FIG. 1.

The numerical control device 1X controls a plurality of drive shafts of the machine tool 110. The numerical control device 1X controls the drive shafts to control cutting of a workpiece 70 while changing the relative positions of the workpiece 70 and a tool 66A. In this process, the numerical control device 1X causes the tool 66A to cut the workpiece 70 while vibrating in a fixed vibrating direction. Note that the vibrating direction of the tool 66A is a fixed direction regardless of the cutting direction, that is, the moving direction of the tool 66A.

In FIG. 1, a driving unit 90, which is a component of the machine tool 110, is illustrated. The driving unit 90 includes a servomotor 901 for moving the tool 66A in an X-axis direction, a servomotor 902 for moving the tool 66A in a Z-axis direction, a detector 97 for detecting the position and the velocity of the servomotor 901, and a detector 98 for detecting the position and the velocity of the servomotor 902. The driving unit 90 also includes an X-axis servo control unit 91 for controlling the servomotor 901 to control the operation of the tool 66A in the X-axis direction, and a Z-axis servo control unit 92 for controlling the servomotor 902 to control the operation of the tool 66A in the Z-axis direction, on the basis of commands from the numerical control device 1X. The X-axis servo control unit 91 performs feedback control on the servomotor 901 on the basis of the position and the velocity detected by the detector 97. The Z-axis servo control unit 92 performs feedback control on the servomotor 902 on the basis of the position and the velocity detected by the detector 98.

The driving unit 90 includes a main shaft motor 911 for rotating a main shaft 60, a detector 211 for detecting the position and the velocity of the main shaft motor 911, and a main shaft servo control unit 200 for controlling the main shaft motor 911 on the basis of commands from the numerical control device 1X. The main shaft servo control unit 200 performs feedback control on the main shaft motor 911 on the basis of the position and the velocity detected by the detector 211.

The machine tool 110 includes a tool rest 65A, a headstock with a first spindle 75, and the driving unit 90 illustrated in FIG. 1. The tool 66A is mounted on the tool rest 65A. The tool rest 65A includes a drive shaft 61X in the X-axis direction and a drive shaft 61Z in the Z-axis direction. The tool rest 65A is movable in the X-axis direction and in the Z-axis direction. The numerical control device 1X controls the main shaft 60 and the drive shafts 61X and 61Z to move the position of the tool 66A on the XZ plane and machine the workpiece 70 by using the tool 66A.

The first spindle 75 rotates with the workpiece 70 mounted thereon, which rotates the workpiece 70. A rotating shaft of the first spindle 75, that is, a rotating shaft of the workpiece 70 is the main shaft 60 of the headstock.

The numerical control device 1X performs cutting while vibrating the tool 66A in a fixed vibrating direction. Cutting with the tool 66A vibrating is also called vibration cutting. The vibrating direction is a moving direction of one of the drive shafts for moving the tool, which is the Z-axis direction in the present embodiment. In the Z-axis direction, the tool 66A moves by a vibration amplitude in addition to the movement distance of the tool 66A itself along a machining path. Hereinafter, the movement distance obtained by adding the vibration amplitude to the movement distance of the tool 66A itself will be referred to as a vibration forward distance.

While the moving directions of the tool 66A are the X-axis direction and the Z-axis direction herein, the present embodiment is not limited to such an example. The axial directions depend on the device configuration, and are therefore not limited to the example described above. In addition, the machine tool 110 may include a plurality of tool rests 65A. In this case, the driving unit 90 includes X-axis servo control units 91, Z-axis servo control units 92, detectors 97 and 98, and servomotors 901 and 902, each associated with corresponding one of the tool rests 65A.

The numerical control device 1X includes a control computation unit 2X, an input operation unit 3, and a display unit 4. The input operation unit 3 is means for inputting information to the control computation unit 2X. The input operation unit 3 is constituted by input means such as a keyboard, buttons, or a mouse. The user can input information such as commands, machining programs, or parameters to the numerical control device 1X by using the input operation unit 3. The information input with use of the input operation unit 3 is input to the control computation unit 2X.

The display unit 4 is constituted by display means such as a liquid crystal display device. The display unit 4 displays information processed by the control computation unit 2X on a display screen.

The control computation unit 2X includes a screen processing unit 31, an input control unit 32, a data setting unit 33, a storage unit 34, a control signal processing unit 35, a programmable logic controller (PLC) 36, an analysis processing unit 37, an interpolation processing unit 38X, an acceleration/deceleration processing unit 39, and an axial data outputting unit 40. Note that the PLC 36 may be installed outside of the control computation unit 2X.

The storage unit 34 includes a parameter storage area 341, a display data storage area 342, a machining program storage area 343, and a shared area 344. The parameter storage area 341 stores parameters to be used for processing performed by the control computation unit 2X, or the like. Specifically, the parameter storage area 341 stores control parameters, servo parameters, and tool data for making the numerical control device 1X operate. The display data storage area 342 stores screen display data to be displayed by the display unit 4. The screen display data are data for displaying information on the display unit 4, and indicating details of screens to be displayed. The machining program storage area 343 stores machining programs to be used for machining of the workpiece 70. A machining program includes vibration commands, which are commands for vibrating the tool 66A, and movement commands, which are commands for moving the tool 66A. The shared area 344 stores data to be temporarily used.

FIG. 3 is a diagram illustrating an example of a machining program to be used by the numerical control device 1X illustrated in FIG. 1. The machining program includes a plurality of commands C1 to C5. A first command C1 is a main shaft rotation command that specifies the speed of the main shaft 60. A second command C2 is a positioning command. In the second command C2, "X10" specifies the position of the tool 66A in the X-axis direction, and "Z50" specifies the position thereof in the Z-axis direction. A third command C3 is a vibration command. In the third command C3, "G165.2" specifies fixing the vibrating direction of the tool 66A to the Z-axis direction, "A2.0" specifies a vibration amplitude thereof, and "D1.0" specifies a vibration frequency thereof. A fourth command C4 is a cutting command in a case where the machining direction is the same as the vibrating direction. In the fourth command C4, "Z10" specifies a movement amount in the Z-axis direction, "F0.5" specifies a feed rate of the tool 66A, and "E0.05" specifies a cutting depth thereof. A fifth command C5 is a cutting command in a case where the machining direction is not the same as the vibrating direction. In the fifth command C5, "X10" specifies a movement amount in the X-axis direction, "Z5" specifies a movement amount in the Z-axis direction, "F0.5" specifies a feed rate of the tool 66A, and "E0.05" specifies a cutting depth thereof.

For example, M codes indicate machine operation commands, in which M3 indicates a main shaft rotation command. G codes indicate commands relating to the movements of the drive shafts. S codes indicate main shaft motor speed commands.

The description refers back to FIG. 1. The analysis processing unit 37 includes a movement command analyzing unit 371, and a vibration command analyzing unit 372. The interpolation processing unit 38X includes a matching determining unit 11, a comparison unit 12, an adjustment unit 13, a waveform generating unit 14, and a vibration movement amount generating unit 15.

The screen processing unit 31 displays the screen display data stored in the display data storage area 342 on the display unit 4. The input control unit 32 receives information input with the input operation unit 3. The data setting unit 33 stores the information received by the input control unit 32 into the storage unit 34. The information received by the input operation unit 3 is written into the storage unit 34 via the input control unit 32 and the data setting unit 33. For example, in a case where input information is related to details of a machining program to be edited, the data setting unit 33 reflects the details to be edited in the machining program held in the machining program storage area 343 of the storage unit 34 and thus stores the edited machining program in the machining program storage area 343. When a parameter is input, the data setting unit 33 updates the parameter held in the parameter storage area 341 of the storage unit 34.

The control signal processing unit 35 is connected with the PLC 36. The control signal processing unit 35 receives, from the PLC 36, signal information such as a relay for making the machine tool 110 operate. The control signal processing unit 35 writes the received signal information into the shared area 344 of the storage unit 34. The signal information is referred to by the interpolation processing unit 38X during machining operation. In addition, when an auxiliary command is output by the analysis processing unit 37 into the shared area 344, the control signal processing unit 35 reads out the auxiliary command from the shared area 344 and transmits the read auxiliary command to the PLC 36. Auxiliary commands are commands other than those for moving the drive shafts. The auxiliary commands are M codes, for example.

When an auxiliary command is sent from the control signal processing unit 35, the PLC 36 performs a process associated with the auxiliary command. The PLC 36 holds ladder programs describing machine operations. Upon receiving an auxiliary command, the PLC 36 performs a process associated with the auxiliary command in accordance with a ladder program. After performing the process associated with the auxiliary command, the PLC 36 sends a completion signal indicating that the process associated with the auxiliary command has been completed to the control signal processing unit 35 so as to execute a next block of the machining program.

In the control computation unit 2X, the control signal processing unit 35, the analysis processing unit 37, and the interpolation processing unit 38X are connected with each other via the storage unit 34, and information is written and read via the storage unit 34. In the description below, the act that information is written and read into and out of the control signal processing unit 35, the analysis processing unit 37, and the interpolation processing unit 38X via the storage unit 34 may be omitted from explanation.

A machining program to be executed is selected by the user by making an input to specify the machining program by using the input operation unit 3, for example. A machining program is specified using machining program identification information for identifying the machining program, for example. The specified machining program identification information is written into the shared area 344 via the input control unit 32 and the data setting unit 33. The analysis processing unit 37 reads the machining program specified with the machining program identification information from the storage unit 34, and analyzes the read machining program. The movement command analyzing unit 371 analyzes movement commands included in the machining program, and generates a movement condition. The movement command analyzing unit 371 generates a movement condition associated with the movement commands represented by G codes. The movement condition includes the moving velocity of the tool rest 65A, a position to which the tool rest 65A is to be moved, and the like.

The vibration command analyzing unit 372 analyzes vibration commands included in the machining program. The vibration command analyzing unit 372 analyzes the vibration commands, and generates a vibration condition. The vibration condition is a condition on vibration in performing vibration cutting. The vibration condition includes a vibrating direction and a vibration frequency in vibration cutting, for example. The vibration frequency is the number of times the tool rest 65A vibrates in the Z-axis direction in one turn of the main shaft 60. The analysis processing unit 37 writes the results of analysis into the shared area 344 of the storage unit 34. The analysis results are the movement condition and the vibration condition, for example.

The matching determining unit 11 of the interpolation processing unit 38X determines whether or not the vibrating direction of the tool 66A and the cutting direction are the same as each other. The vibrating direction is a vibrating direction specified by a vibration command extracted through analysis of the machining program by the vibration command analyzing unit 372 of the analysis processing unit 37, for example. The vibrating direction is written into the shared area 344 by the analysis processing unit 37. Alternatively, the vibrating direction may be a direction specified by the PLC 36. In this case, the vibrating direction is written into the shared area 344 by the control signal processing unit 35. Alternatively, the vibrating direction may be a direction specified by the user by using the input operation unit 3. In this case, the vibrating direction is written into the parameter storage area 341 by the data setting unit 33. The matching determining unit 11 reads the vibrating direction from the storage unit 34. In a manner similar to the vibrating direction, the cutting direction may be a direction specified by a movement command in the machining program, a direction specified by the PLC 36, or a direction specified by the user by using the input operation unit 3. Because the cutting direction is written into the shared area 344, the matching determining unit 11 reads the cutting direction from the storage unit 34.

When the result of determination of the matching determining unit 11 shows that the vibrating direction and the cutting direction are not the same as each other, the comparison unit 12 compares a command value of the cutting depth with an actual value of the cutting depth based on the vibration amplitude of the drive shaft 61Z. Note that the cutting depth is a difference between the position of a face to be machined of the workpiece 70 before cutting and the machined face after cutting. In a manner similar to the cutting direction and the vibrating direction, the command value of the cutting depth may be a value specified by a movement command in the machining program, a value specified by the PLC 36, or a value specified by the user by using the input operation unit 3. The actual value of the cutting depth is an actual value determined on the basis of a movement command and a vibration command. In the present embodiment, because the center of vibration of the tool 66A is on the face to be machined of the workpiece 70, the actual value of the cutting depth is the vibration amplitude. Hereinafter, the actual value of the cutting depth is assumed to be the vibration amplitude in the description.

The adjustment unit 13 has a function of adjusting commands for specifying the movement of the tool 66A. When the actual value of the cutting depth is larger than a command value, the adjustment unit 13 adjusts the movement of the tool 66A so that the actual value becomes equal to or smaller than the command value. Details of the adjustment unit 13 will be described later.

The waveform generating unit 14 generates a basic waveform of vibration on the basis of information obtained from the analysis processing unit 37. When the adjustment unit 13 has adjusted a command, the waveform generating unit 14 generates a basic waveform of vibration on the basis of the adjusted command.

The vibration movement amount generating unit 15 obtains, from the basic waveform generated by the waveform generating unit 14, a vibration forward position by adding the basic waveform to the movement path and a vibration backward position by subtracting the amplitude therefrom. The vibration movement amount generating unit 15 generates a vibration movement amount along each of the X axis and the Z axis. The vibration movement amounts generated by the vibration movement amount generating unit 15 are sent to the driving unit 90 via the acceleration/deceleration processing unit 39 and the axial data outputting unit 40. The driving unit 90 controls the servomotors 901 and 902 on the basis of the vibration movement amounts from the vibration movement amount generating unit 15 to perform vibration cutting.

The acceleration/deceleration processing unit 39 performs an acceleration/deceleration process for smoothly changing the acceleration on the result of the interpolation process supplied from the interpolation processing unit 38X. The acceleration/deceleration processing unit 39 performs the acceleration/deceleration process at the start and at the end of movement. Specifically, the acceleration/deceleration processing unit 39 generates a movement command in the X-axis direction on the basis of the movement amount in the X-axis direction, and a movement command in the Z-axis direction on the basis of the movement amount in the Z-axis direction. The acceleration/deceleration processing unit 39 outputs a velocity command, which is a processing result of the acceleration/deceleration process, to the axial data outputting unit 40. Note that the acceleration/deceleration processing unit 39 does not perform the acceleration/deceleration process on the main shaft speed. The acceleration/deceleration processing unit 39 sends a speed command associated with the main shaft speed to the axial data outputting unit 40.

The axial data outputting unit 40 outputs the velocity command to the driving unit 90. Specifically, the axial data outputting unit 40 outputs a velocity command for the X axis to the X-axis servo control unit 91, and a velocity command for the Z axis to the Z-axis servo control unit 92. The axial data outputting unit 40 also outputs the speed command for the main shaft 60 to the main shaft servo control unit 200. Thus, the X-axis servo control unit 91 controls the operation in the X-axis direction, the Z-axis servo control unit 92 controls the operation in the Z-axis direction, and the main shaft servo control unit 200 controls the rotating operation of the main shaft 60.

Figure 4:
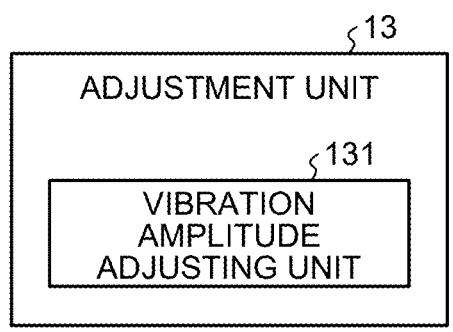
FIG. 4 is a diagram illustrating a configuration of an adjustment unit according to the first embodiment of the present invention.

FIG. 4 is a diagram illustrating a configuration of the adjustment unit 13 according to the first embodiment of the present invention. The adjustment unit 13 includes a vibration amplitude adjusting unit 131. The adjustment unit 13 can adjust the movement of the tool 66A by adjusting commands for specifying the movement of the tool 66A. Various methods can be considered for a method for adjusting the movement of the tool 66A; in the present embodiment, the adjustment unit 13 adjusts the movement of the tool 66A by adjusting the vibration amplitude.

Figure 5:
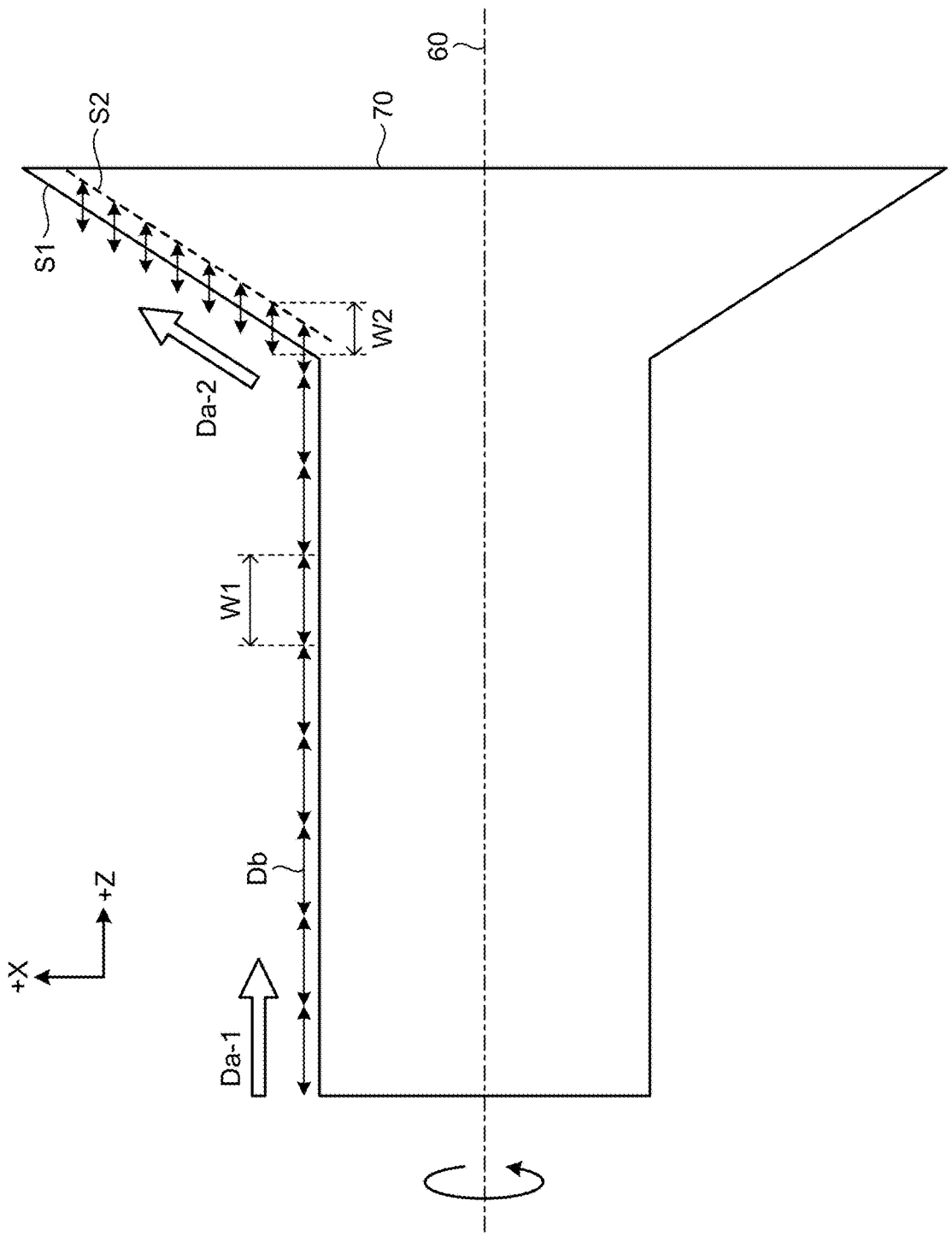
FIG. 5 is a diagram for explaining the functions of the adjustment unit illustrated in FIG. 4.

The vibration amplitude adjusting unit 131 adjusts the vibration amplitude so that the actual value of the cutting depth becomes equal to or smaller than a command value. FIG. 5 is a diagram for explaining the functions of the adjustment unit 13 illustrated in FIG. 4. The workpiece 70 rotates about the main shaft 60. In this state, the tool 66A vibrates in a vibrating direction db while moving in cutting directions Da-1 and Da-2. The vibrating direction db of the tool 66A is fixed even when the moving direction of the tool 66A has changed from the cutting direction Da-1 to the cutting direction Da-2. When tool 66A moves in the cutting direction Da-2 that is not the same as the vibrating direction db, the center of vibration of the tool 66A is on the surface of a face to be machined. While the tool 66A is moving in the cutting direction Da-1, the tool 66A vibrates with a vibration amplitude W1. Upon detecting that the cutting direction Da-2 and the vibrating direction db are not the same as each other, the vibration amplitude adjusting unit 131 changes the vibration amplitude to a vibration amplitude W2. The vibration amplitude W2 is adjusted to be equal to or smaller than a command value of a cutting depth, which is a difference in the Z-axis direction between a first machining target face S1, which is a face to be machined before cutting, and a second machining target face S2, which is the machined face after cutting.

Figure 6:
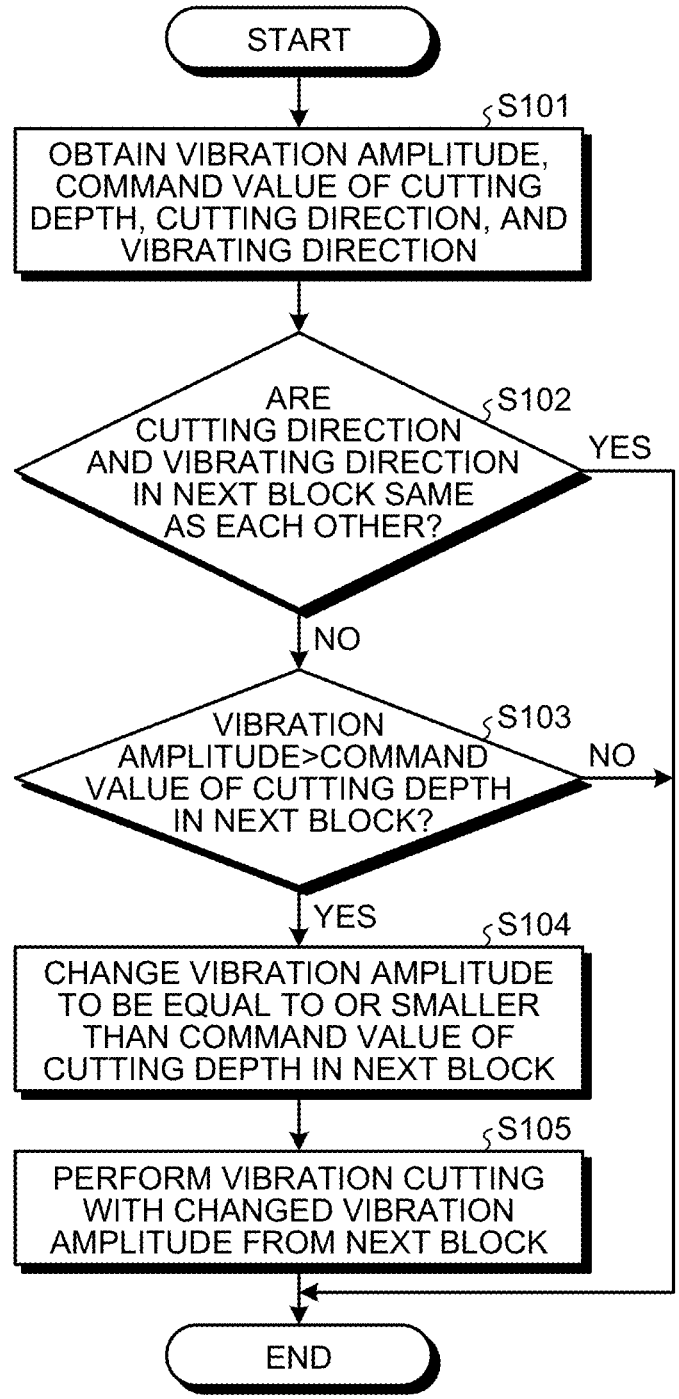
FIG. 6 is a flowchart for explaining the operation of the numerical control device including the adjustment unit illustrated in FIG. 4.

FIG. 6 is a flowchart for explaining the operation of the numerical control device 1X including the adjustment unit 13 illustrated in FIG. 4. The interpolation processing unit 38X of the numerical control device 1X obtains, for each block of a machining program, a vibration amplitude, a command value of the cutting depth, a cutting direction, and a vibrating direction (step S101). The matching determining unit 11 determines whether or not the cutting direction and the vibrating direction of a next block are the same as each other (step S102).

If the cutting direction and the vibrating direction are not the same as each other (step S102: No), the comparison unit 12 compares the vibration amplitude and the command value of the cutting depth in the next block to determine whether or not the vibration amplitude is larger than the command value of the cutting depth (step S103). Note that the vibration amplitude is an example of the actual value of the cutting depth. Because the tool 66A vibrates with the center of vibration being a face to be machined herein, the actual value of the cutting depth is assumed to be the vibration amplitude. When the vibration center of the tool 66A is not the face to be machined, an actual value of the cutting depth calculated on the basis of the vibration amplitude is used.

If the vibration amplitude is larger than the command value of the cutting depth (step S103: Yes), the vibration amplitude adjusting unit 131 of the adjustment unit 13 changes the vibration amplitude of the next block to be equal to or smaller than the command value of the cutting depth (step S104). The numerical control device 1X performs vibration cutting with the changed vibration amplitude from the next block (step S105). Specifically, the waveform generating unit 14 generates a basic waveform of vibration on the basis of the adjusted vibration amplitude. The vibration movement amount generating unit 15 obtains, from the basic waveform generated by the waveform generating unit 14, a vibration forward position and a vibration backward position by superimposing the basic waveform to the movement path, and generates vibration movement amounts of the drive shafts in the next block specified in the machining program. The vibration movement amounts generated by the vibration movement amount generating unit 15 are sent to the driving unit 90 via the acceleration/deceleration processing unit 39 and the axial data outputting unit 40. The driving unit 90 controls the drive shafts specified in the machining program on the basis of the vibration movement amounts to perform vibration cutting.

If the cutting direction and the vibrating direction are the same as each other (step S102: Yes), the processes in steps S103 to S105 are omitted. If the vibration amplitude is equal to or smaller than the command value of the cutting depth (step S103: No), the processes in steps S104 and S105 are omitted, and the vibration cutting is continued with the set main shaft speed, vibration frequency, and vibration amplitude.

As described above, according to the first embodiment of the present invention, in the numerical control device 1X having the vibration cutting function with a fixed vibrating direction, when the cutting direction, which is the movement direction of the tool 66A of the machine tool 110, is not the same as the vibrating direction of the tool 66A, a command value of the cutting depth, which is a difference between the position of a face to be machined of the workpiece 70 before cutting and the position of the machined face after cutting, is compared with the vibration amplitude, which is an actual value of the cutting depth, and the movement of the tool 66A is adjusted so that the actual value becomes equal to or smaller than the command value when the actual value is larger than the command value. In this process, the vibration amplitude adjusting unit 131 of the adjustment unit 13 adjusts the movement of the tool 66A by adjusting the vibration amplitude of the tool 66A. As a result, even when the moving direction and the vibrating direction of the tool 66A are not the same as each other, the workpiece 70 is not excessively cut by vibration cutting. Thus, degradation in the machining accuracy can be reduced or prevented.

Note that, in the present embodiment, the vibration amplitude is adjusted so that the actual value of the cutting depth becomes equal to or smaller than the command value. While the vibration amplitude preferably needs to be adjusted to be equal to or smaller than the command value, the vibration amplitude may, however, be slightly larger than the command value depending on required machining accuracy. Thus, when the actual value of the cutting depth is larger than the command value, an excessive cut amount of the workpiece 70 can be reduced by adjustment of the difference between the actual value of the cutting depth and the command value to be smaller, that is, adjustment of the actual value to be smaller.

Second Embodiment

Figure 7:
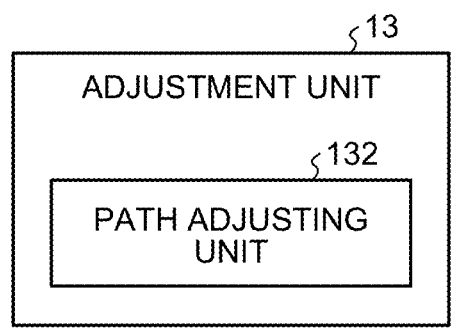
FIG. 7 is a diagram illustrating a configuration of an adjustment unit according to a second embodiment of the present invention.

FIG. 7 is a diagram illustrating a configuration of an adjustment unit 13 according to a second embodiment of the present invention. Because the configuration of a numerical control device 1X according to the present embodiment is similar to that in the first embodiment illustrated in FIG. 1 except for the adjustment unit 13, detailed description thereof will not be repeated here. Differences from the first embodiment will be mainly described below.

The adjustment unit 13 includes a path adjusting unit 132. The adjustment unit 13 can adjust the movement of the tool 66A by adjusting commands for specifying the movement of the tool 66A. Various methods can be considered for a method for adjusting the movement of the tool 66A; in the present embodiment, the adjustment unit 13 adjusts the movement of the tool 66A by adjusting the machining path.

Figure 8:
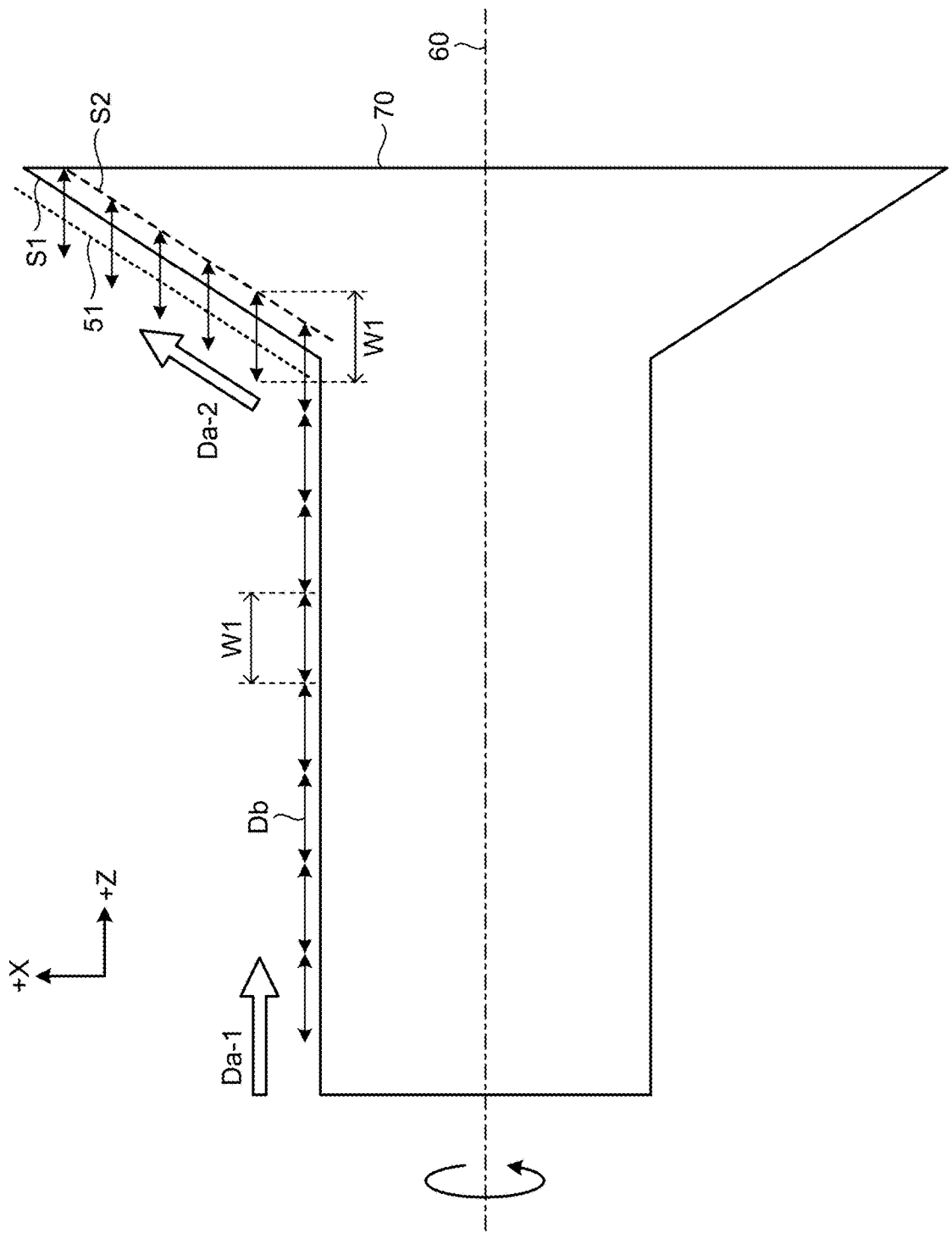
FIG. 8 is a diagram for explaining the functions of the adjustment unit illustrated in FIG. 7.

The path adjusting unit 132 adjusts the movement path of the tool 66A so that an actual value of the cutting depth becomes equal to or smaller than a command value. FIG. 8 is a diagram for explaining the functions of the adjustment unit 13 illustrated in FIG. 7. The workpiece 70 rotates about the main shaft 60. In this state, the tool 66A vibrates in a vibrating direction db while moving in cutting directions Da-1 and Da-2. The vibrating direction db of the tool 66A is fixed even when the moving direction of the tool 66A has changed from the cutting direction Da-1 to the cutting direction Da-2. In the present embodiment, the vibration amplitude W1 of the tool 66A is constant regardless of the cutting directions Da-1 and Da-2 of the tool 66A. Upon detecting that the cutting direction Da-2 and the vibrating direction db are not the same as each other, the path adjusting unit 132 adjusts the movement path of the tool 66A so that an actual value of the cutting depth becomes equal to or smaller than a command value while maintaining the vibration amplitude W1. The movement path of the tool 66A before adjustment is the first machining target face S1, and the movement path of the tool 66A after adjustment is a path 51.

Figure 9:
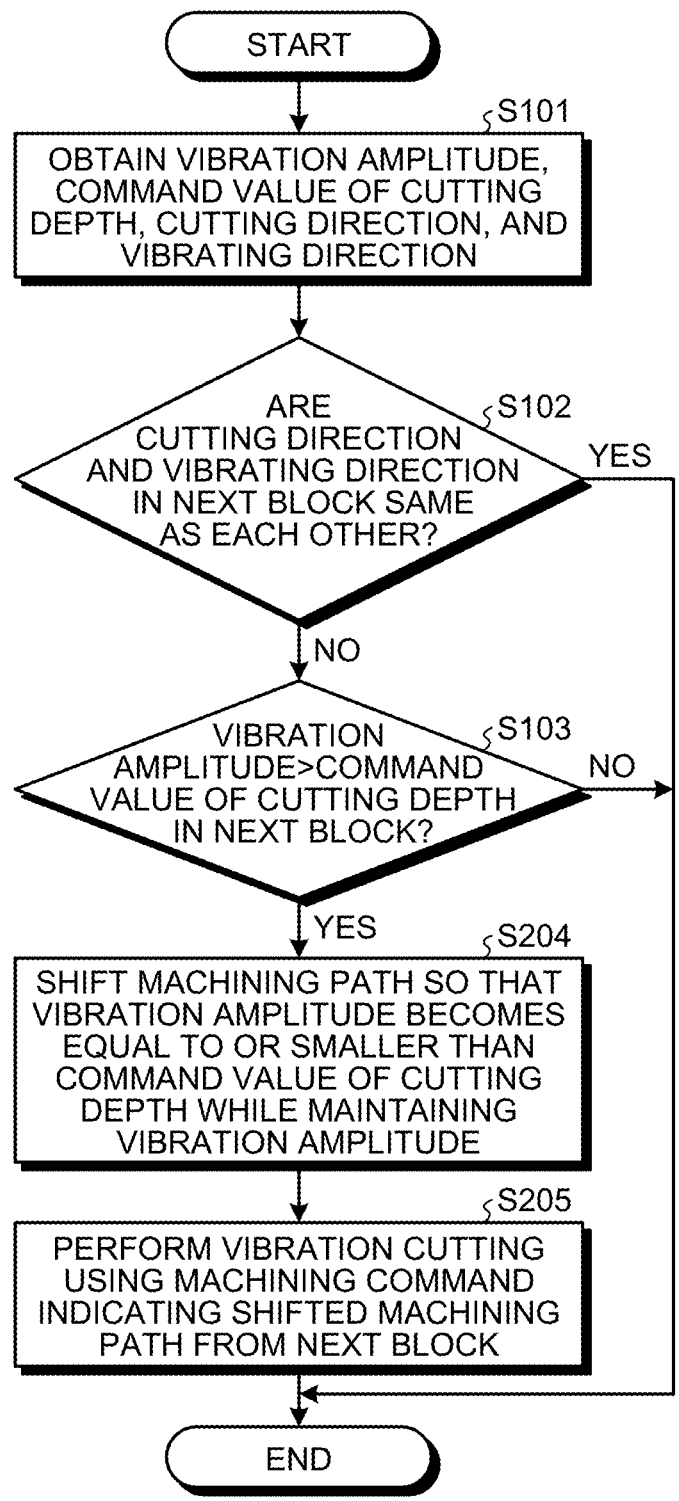
FIG. 9 is a flowchart for explaining the operation of a numerical control device including the adjustment unit illustrated in FIG. 7.

FIG. 9 is a flowchart for explaining the operation of the numerical control device 1X including the adjustment unit 13 illustrated in FIG. 7. The interpolation processing unit 38X of the numerical control device 1X obtains, for each block of a machining program, a vibration amplitude, a command value of the cutting depth, a cutting direction, and a vibrating direction (step S101). The matching determining unit 11 determines whether or not the cutting direction and the vibrating direction of a next block are the same as each other (step S102).

If the cutting direction and the vibrating direction are not the same as each other (step S102: No), the comparison unit 12 compares the vibration amplitude and the command value of the cutting depth in the next block to determine whether or not the vibration amplitude is larger than the command value of the cutting depth (step S103).

If the vibration amplitude is larger than the command value of the cutting depth (step S103: Yes), the path adjusting unit 132 of the adjustment unit 13 maintains the vibration amplitude, and shifts the machining path so that the vibration amplitude becomes equal to or smaller than the command value of the cutting depth while maintaining the vibration amplitude (step S204). The numerical control device 1X performs vibration cutting using a machining command indicating the shifted machining path from the next block (step S205). Specifically, the waveform generating unit 14 generates a basic waveform of vibration on the basis of the vibration amplitude. The vibration movement amount generating unit 15 obtains, from the shifted machining path and the basic waveform generated by the waveform generating unit 14, a vibration forward position and a vibration backward position by superimposing the basic waveform to the movement path, and generates vibration movement amounts of the drive shafts in the next block specified in the machining program. The vibration movement amounts generated by the vibration movement amount generating unit 15 are sent to the driving unit 90 via the acceleration/deceleration processing unit 39 and the axial data outputting unit 40. The driving unit 90 controls the drive shafts specified in the machining program on the basis of the vibration movement amounts to perform vibration cutting.

If the cutting direction and the vibrating direction are the same as each other (step S102: Yes), the processes in steps S103, S204, and S205 are omitted. If the vibration amplitude is equal to or smaller than the command value of the cutting depth (step S103: No), the processes in steps S204 and S205 are omitted, and the vibration cutting is continued with the set main shaft speed, vibration frequency, and vibration amplitude.

As described above, according to the second embodiment of the present invention, in the numerical control device 1X having the vibration cutting function with a fixed vibrating direction, when the cutting direction, which is the movement direction of the tool 66A of the machine tool 110, is not the same as the vibrating direction of the tool 66A, a command value of the cutting depth, which is a difference between the position of a face to be machined of the workpiece 70 before cutting and the position of the machined face after cutting, is compared with the vibration amplitude, which is an actual value of the cutting depth. The movement of the tool 66A is adjusted so that the actual value becomes equal to or smaller than the command value when the actual value is larger than the command value. In this process, the path adjusting unit 132 of the adjustment unit 13 adjusts the movement of the tool 66A by adjusting the movement path of the tool 66A while maintaining the vibration amplitude of the tool 66A. As a result, in a manner similar to the first embodiment, even when the moving direction and the vibrating direction of the tool 66A are not the same as each other, the workpiece 70 is not excessively cut by vibration cutting. Thus, degradation in the machining accuracy can be reduced or prevented.

Note that, in the present embodiment, the vibration amplitude is adjusted so that the actual value of the cutting depth becomes equal to or smaller than the command value. While the vibration amplitude preferably needs to be adjusted to be equal to or smaller than the command value, the vibration amplitude may, however, be slightly larger than the command value depending on required machining accuracy. Thus, when the actual value of the cutting depth is larger than the command value, an excessive cut amount of the workpiece 70 can be reduced by adjustment of the difference between the actual value of the cutting depth and the command value to be smaller, that is, adjustment of the actual value to be smaller.

Third Embodiment

Figure 10:
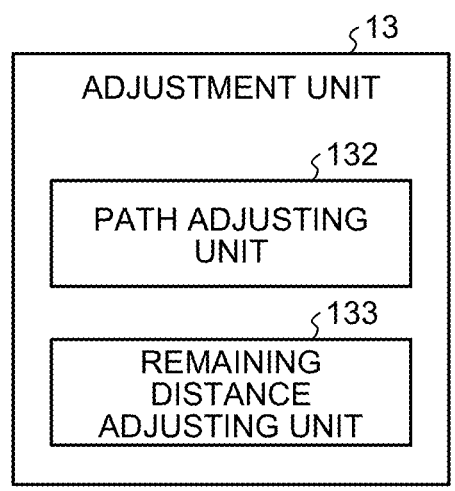
FIG. 10 is a diagram illustrating a configuration of an adjustment unit according to a third embodiment of the present invention.

FIG. 10 is a diagram illustrating a configuration of an adjustment unit 13 according to a third embodiment of the present invention. The adjustment unit 13 includes the path adjusting unit 132 and a remaining distance adjusting unit 133. Because the configuration of a numerical control device 1X according to the present embodiment is similar to that in the first embodiment illustrated in FIG. 1 except for the adjustment unit 13, detailed description thereof will not be repeated here. Differences from the first embodiment will be mainly described below. In addition, because the functions of the path adjusting unit 132 are similar to those in the second embodiment, the description thereof will not be repeated here.

Figure 11:
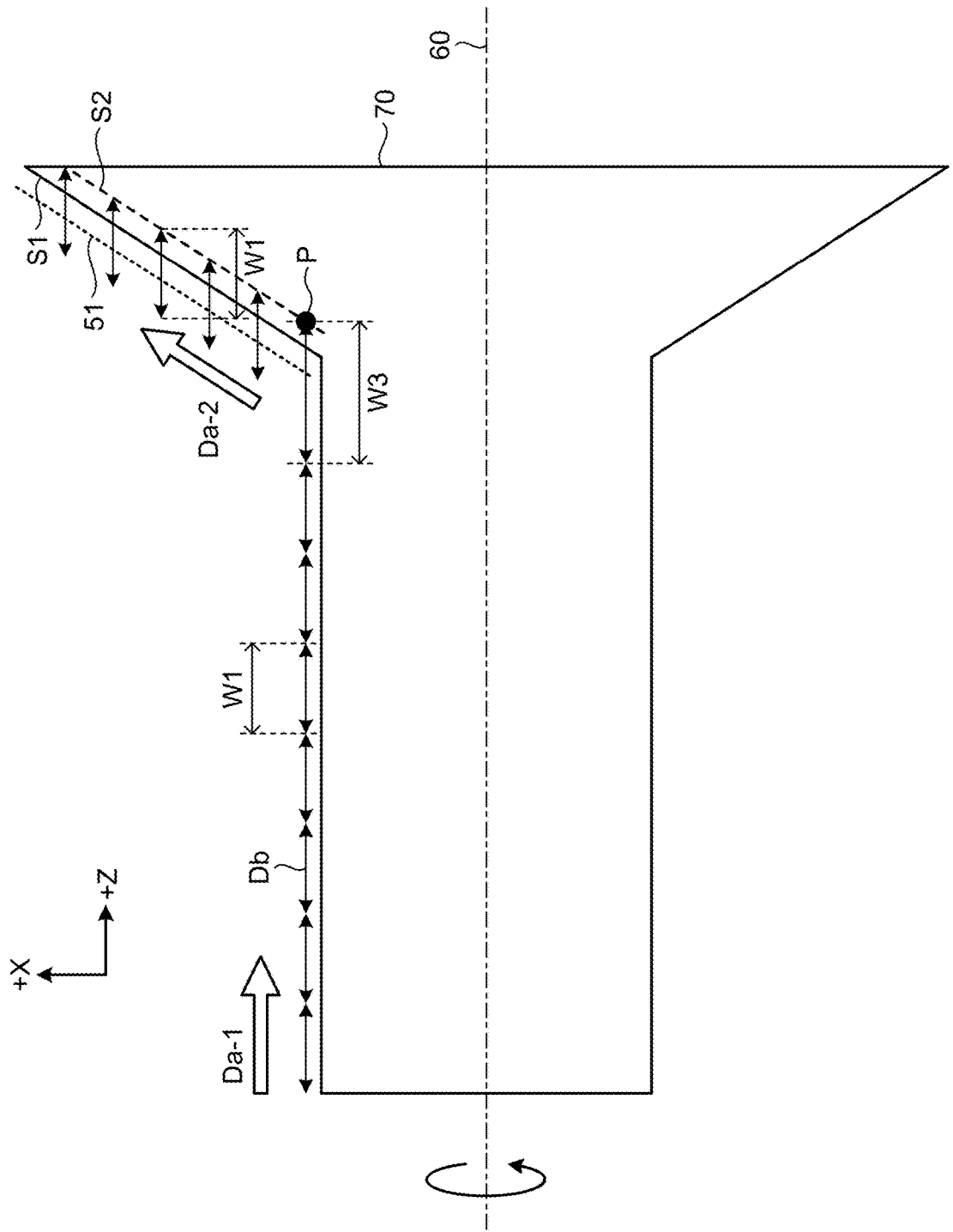
FIG. 11 is a diagram for explaining the functions of the adjustment unit illustrated in FIG. 10.

The remaining distance adjusting unit 133 adjusts the vibration amplitude on the basis of a remaining distance to a point at which the cutting direction changes. FIG. 11 is a diagram for explaining the functions of the adjustment unit 13 illustrated in FIG. 10. The workpiece 70 rotates about the main shaft 60. In this state, the tool 66A vibrates in a vibrating direction db while moving in cutting directions Da-1 and Da-2. The vibrating direction db of the tool 66A is fixed even when the moving direction of the tool 66A has changed from the cutting direction Da-1 to the cutting direction Da-2. In the present embodiment, the vibration amplitude W1 of the tool 66A is constant regardless of the cutting directions Da-1 and Da-2 of the tool 66A. Upon detecting that the cutting direction Da-2 and the vibrating direction db are not the same as each other, the path adjusting unit 132 adjusts the movement path of the tool 66A so that an actual value of the cutting depth becomes equal to or smaller than a command value while maintaining the vibration amplitude W1. The movement path of the tool 66A before adjustment is the first machining target face S1, and the movement path of the tool 66A after adjustment is a path 51. Note that the remaining distance adjusting unit 133 adjusts the vibration amplitude from the vibration amplitude W1 to a vibration amplitude W3 on the basis of a distance to a point P at which the cutting direction changes. After the cutting direction has changed, the vibration amplitude is adjusted back to the vibration amplitude W1. While an example of W3>W1 is illustrated in FIG. 11, adjustment can be similarly made when W3<W1.

Figure 12:
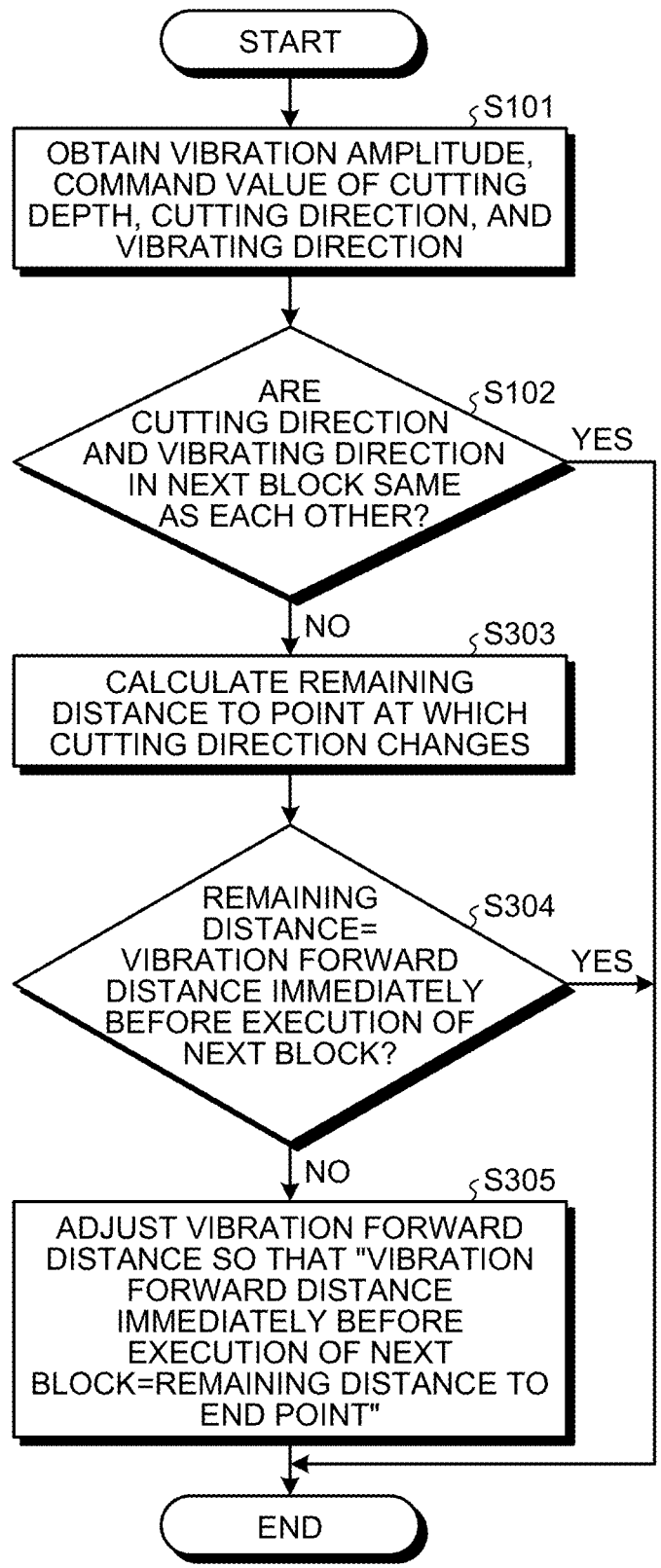
FIG. 12 is a flowchart for explaining the operation of a numerical control device including the adjustment unit illustrated in FIG. 10.

FIG. 12 is a flowchart for explaining the operation of the numerical control device 1X including the adjustment unit 13 illustrated in FIG. 10. The interpolation processing unit 38X of the numerical control device 1X obtains, for each block of a machining program, a vibration amplitude, a command value of the cutting depth, a cutting direction, and a vibrating direction (step S101). The matching determining unit 11 determines whether or not the cutting direction and the vibrating direction of a next block are the same as each other (step S102).

If the cutting direction and the vibrating direction are not the same as each other (step S102: No), the remaining distance adjusting unit 133 calculates the remaining distance to the point P at which the cutting direction changes (step S303). The remaining distance adjusting unit 133 determines whether or not the remaining distance is equal to a vibration forward distance immediately before execution of the next block (step S304).

If the remaining distance is not equal to the vibration forward distance immediately before execution of the next block (step S304: No), the remaining distance adjusting unit 133 adjusts the vibration forward distance so that the vibration forward distance immediately before execution of the next block becomes the remaining distance to an end point (step S305).

If the cutting direction and the vibrating direction are the same as each other (step S102: Yes), the processes in steps S303 to S305 are omitted. If the remaining distance is equal to the vibration forward distance immediately before execution of the next block (step S304: Yes), the process in step S305 is omitted. Note that the processes illustrated in FIG. 12 are performed in parallel with the processes illustrated in FIG. 9.

While the adjustment unit 13 includes the path adjusting unit 132 and the remaining distance adjusting unit 133 here, the adjustment unit 13 may include the vibration amplitude adjusting unit 131 and the remaining distance adjusting unit 133. In this case, the processes illustrated in FIG. 6 and the processes illustrated in FIG. 12 are performed in parallel.

As described above, according to the third embodiment of the present invention, in a manner similar to the first embodiment and the second embodiment, the movement of the tool 66A is adjusted even when the moving direction and the vibrating direction of the tool 66A are not the same as each other, which enables reduction or prevention of degradation in machining accuracy. In addition, the remaining distance adjusting unit 133 adjusts the vibration forward distance before the point P at which the cutting direction changes, and cutting is thus performed to the point P at which the cutting direction changes in view of the movement of the tool 66A caused by vibration, and the cutting direction is then changed. The workpiece 70 is therefore not excessively cut by vibration cutting. Thus, the machining accuracy at the point P at which the cutting direction changes can be improved.

Fourth Embodiment

Figure 13:
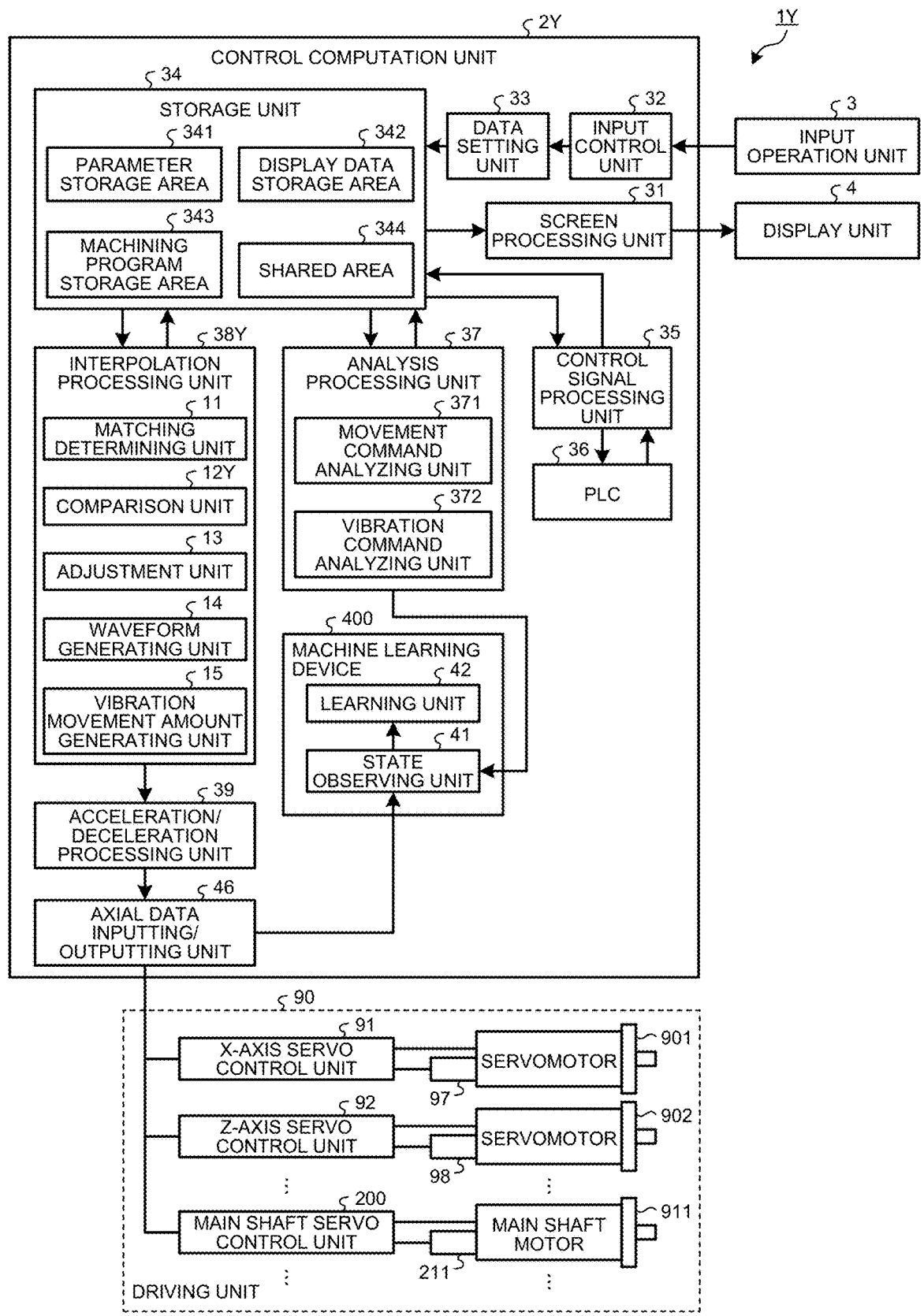
FIG. 13 is a diagram illustrating a functional configuration of a numerical control device according to a fourth embodiment of the present invention.

FIG. 13 is a diagram illustrating a functional configuration of a numerical control device 1Y according to a fourth embodiment of the present invention. The numerical control device 1Y includes a control computation unit 2Y, an input operation unit 3, and a display unit 4. The control computation unit 2Y includes the screen processing unit 31, the input control unit 32, the data setting unit 33, the storage unit 34, the control signal processing unit 35, the PLC 36, the analysis processing unit 37, an interpolation processing unit 38Y, the acceleration/deceleration processing unit 39, an axial data inputting/outputting unit 46, and a machine learning device 400.

Hereinafter, differences from the numerical control device 1X illustrated in FIG. 1 will be mainly described, and similar functional components will be represented by the same reference numerals, and detailed description thereof will not be repeated. The interpolation processing unit 38Y includes the matching determining unit 11, a comparison unit 12Y, the adjustment unit 13, the waveform generating unit 14, and the vibration movement amount generating unit 15.

The machine learning device 400 learns a command value of the cutting depth. The machine learning device 400 includes a state observing unit 41, and a learning unit 42. The state observing unit 41 observes, as state variables, machining program identification information for identifying a machining program describing procedures for controlling drive shafts, machining path information indicating a machining path of the tool 66A, tool identification information for identifying the tool 66A, offset information indicating an offset of the tool 66A, and a command value of the cutting depth. The state observing unit 41 obtains the machining program identification information, the machining path information, the tool identification information, and the offset information from the analysis processing unit 37.

The state observing unit 41 also observes feedback of position information via the axial data inputting/outputting unit 46, and the learning unit 42 finally learns the command value of the cutting depth. The state observing unit 41 creates a training data set on the basis of the state variables, and outputs the created training data set to the learning unit 42.

The learning unit 42 learns the command value of the cutting depth by using the training data set created on the basis of the state variables. The learning unit 42 can learn the command value of the cutting depth through so-called supervised learning in accordance with a neural network model, for example. Supervised learning is a model in which a large number of data sets of inputs and results are given to the machine learning device 400 to learn features of the data sets, and a result is estimated from an input.

A neural network is constituted by an input layer constituted by a plurality of neurons, an intermediate layer constituted by a plurality of neurons, and an output layer constituted by a plurality of neurons. The number of intermediate layers may be one, or two or more. In a case of a neural network with three layers, when a plurality of inputs are input to the input layer, the values thereof are multiplied by weights and input to the intermediate layer, and the resulting values are further multiplied by weights and output from the output layer. The output results vary depending on the values of the weights.

The learning unit 42 outputs, as a result of learning, an estimated value of the cutting depth in each of cutting commands in the machining program through supervised learning in accordance with a data set observed by the state observing unit 41.

While an example of a configuration in which supervised learning is used is illustrated in FIG. 13, the learning unit 42 may use unsupervised learning. In this case, parameters to be learned need not be given to the machine learning device 400.

Unsupervised learning is a method of giving only a large amount of input data to the machine learning device 400 to learn how the input data are distributed, in which learning is performed through compression, classification, shaping, and the like of the input data without corresponding training output data being given. Features in the data sets can be clustered on the basis of similarities, or the like. The result thereof can be used to predict an output by setting a certain criterion, and assigning an output that optimizes the criterion.

While the learning unit 42 uses data sets created for one numerical control device 1Y herein, learning may be performed using data sets created for a plurality of numerical control devices 1Y. The learning unit 42 may collect data sets from a plurality of numerical control devices 1Y used in the same place, or may use data sets collected from numerical control devices 1Y of a plurality of machine tools 110 operating independently in different places. In the present configuration, a numerical control device 1Y from which data sets are to be collected can further be added during learning, or can be removed from numerical control devices 1Y from which data sets are to be collected. Alternatively, a machine learning device 400 that has learned from a numerical control device 1Y may be attached to another numerical control device 1Y to perform relearning of information on the vibration cutting performed by this numerical control device 1Y, and update the result of learning the cutting depth in each of the cutting commands in the machining program.

Alternatively, the learning unit 42 may use deep learning for learning extraction of feature quantities themselves. The learning algorithm used by the learning unit 42 is not limited thereto, and may be other known methods such as genetic programming, functional logic programming, a support vector machine, or the like.

In addition, while the machine learning device 400 is included in the numerical control device 1Y in FIG. 13, the present embodiment is not limited to this example. For example, the machine learning device 400 may be a device separated from the numerical control device 1Y and connected with the numerical control device 1Y via a network. In addition, the machine learning device 400 may be present in a cloud server.

An estimated value of the command value of the cutting depth, which is a result of learning output from the machine learning device 400, is output to the comparison unit 12Y. The comparison unit 12Y compares an actual value of the cutting depth based on the vibration amplitude with the command value of the cutting depth indicated by the learning result.

As described above, according to the fourth embodiment of the present invention, a command value of the cutting depth in accordance with a machining program can be obtained for each cutting command in the machining program even without input of the user specifying a cutting depth and without a cutting depth specified in the machining program. Thus, the burden on a person who creates machining programs and the burden on a person who operates the numerical control device 1Y can be reduced.

Figure 14:
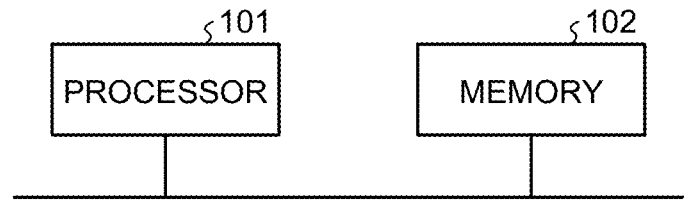
FIG. 14 is a diagram for explaining the hardware configuration of the numerical control devices according to the first to fourth embodiments of the present invention.

Next, a hardware configuration of the numerical control devices 1X and 1Y according to the first to fourth embodiments of the present invention will be described. FIG. 14 is a diagram for explaining the hardware configuration of the numerical control devices 1X and 1Y according to the first to fourth embodiments of the present invention. The functions of the control computation units 2X and 2Y included in the numerical control devices 1X and 1Y, and the machine learning device 400 included in the numerical control device 1Y can be implemented by a processor 101 and a memory 102 illustrated in FIG. 14.

The processor 101 is a CPU, and is also referred to as a central processing device, a processing device, a computing device, a microprocessor, a microcomputer, a digital signal processor (DSP), or the like. The memory 102 is a nonvolatile or volatile semiconductor memory such as a random access memory (RAM), a read only memory (ROM), a flash memory, an erasable programmable ROM (EPROM), or an electrically EPROM (EEPROM; registered trademark), a magnetic disk, a flexible disk, an optical disk, a compact disc, a mini disc, a digital versatile disk (DVD), or the like, for example.

The functions of the control computation units 2X and 2Y and the machine learning device 400 are implemented by the processor 101 reading and executing programs corresponding to the processes of the components stored in the memory 102. In addition, the memory 102 is also used as a temporary memory in processes performed by the processor 101.

The configurations presented in the embodiments above are examples of the present invention, and can be combined with other known technologies or can be partly omitted or modified without departing from the scope of the present invention.

REFERENCE SIGNS LIST 1X, 1Y numerical control device; 2X, 2Y control computation unit; 3 input operation unit; 4 display unit; matching determining unit; 12, 12Y comparison unit; 13 adjustment unit; 14 waveform generating unit; 15 vibration movement amount generating unit; 31 screen processing unit; 32 input control unit; 33 data setting unit; 34 storage unit; 35 control signal processing unit; PLC; 37 analysis processing unit; 38X, 38Y interpolation processing unit; 39 acceleration/deceleration processing unit; 40 axial data outputting unit; 41 state observing unit; 42 learning unit; 46 axial data inputting/outputting unit; 51 path; main shaft; 61X, 61Z drive shaft; 65A tool rest; 66A tool; 70 workpiece; 75 first spindle; 90 driving unit; 91 X-axis servo control unit; 92 Z-axis servo control unit; 97, 98, 211 detector; 101 processor; 102 memory; 110 machine tool; 131 vibration amplitude adjusting unit; 132 path adjusting unit; 133 remaining distance adjusting unit; 200 main shaft servo control unit; 341 parameter storage area; 342 display data storage area; 343 machining program storage area; 344 shared area; 371 movement command analyzing unit; 372 vibration command analyzing unit; 400 machine learning device; 901, 902 servomotor; 911 main shaft motor; Da-1, Da-2 cutting direction; db vibrating direction; S1 first machining target face; S2 second machining target face; W1, W2, W3 vibration amplitude.

The invention claimed is:

1. A numerical control device for controlling a plurality of drive shafts to drive a tool and cause the tool to cut a workpiece while vibrating the tool in a fixed vibrating direction regardless of a cutting direction, the cutting direction being a moving direction of the tool, the numerical control device comprising:
a first processor; and
a first memory to store a first program which, when executed by the first processor, performs processes of
determining whether or not the vibrating direction and the cutting direction are the same as each other;
comparing a command value of a cutting depth with an actual value of the cutting depth based on a vibration amplitude of the drive shaft when the vibrating direction and the cutting direction are not the same as each other, the cutting depth being a difference between a position of a face to be machined of the workpiece before machining and a position of the machined face after machining in the vibrating direction; and
adjusting a movement of the tool so that the actual value becomes smaller when the actual value is larger than the command value.

2. The numerical control device according to claim 1, wherein the first processor further adjusts the vibration amplitude so that the actual value becomes equal to or smaller than the command value.

3. The numerical control device according to claim 1, wherein the first processor further adjusts a movement path of the tool so that the actual value becomes equal to or smaller than the command value.

4. The numerical control device according to claim 1, wherein the first processor further adjusts the vibration amplitude on the basis of a remaining distance to a point at which the cutting direction changes.

5. The numerical control device according to claim 1, further comprising:
a machine learning device including:
a second processor; and
a second memory to store a second program which, when executed by the second processor, performs processes of:

observing, as state variables, machining program identification information for identifying a machining program describing procedures for controlling the drive shafts, machining path information indicating a machining path of the tool, tool identification information for identifying the tool, and offset information indicating an offset of the tool; and learning the cutting depth in accordance with a data set created on the basis of the state variables.

6. The numerical control device according to claim 5, wherein the first processor compares the actual value with a command value of the cutting depth indicated by a result of the learning.

7. A machine learning device for learning a command value of a cutting depth, the cutting depth being a difference between a face to be machined of a workpiece before machining and the machined face after machining in a fixed vibrating direction, in vibration cutting in which a plurality of drive shafts are controlled to drive a tool and cause the tool to machine the workpiece while vibrating the tool in the vibrating direction regardless of a cutting direction, the cutting direction being a moving direction of the tool, the machine learning device comprising:

a third processor; and a third memory to store a third program which, when executed by the third processor, performs processes of:

observing, as state variables, machining program identification information for identifying a machining program describing procedures for controlling the drive shafts, machining path information indicating a machining path of the tool, and tool identification information for identifying the tool; and learning the cutting depth for each cutting command in the machining program in accordance with a data set created on the basis of the state variables.

8. A numerical control method for controlling a plurality of drive shafts to drive a tool and cause the tool to cut a workpiece while vibrating the tool in a fixed vibrating direction regardless of a cutting direction, the cutting direction being a moving direction of the tool, the numerical control method comprising:

determining, whether or not the vibrating direction and the cutting direction are the same as each other;

comparing, a command value of a cutting depth with an actual value of the cutting depth based on a vibration amplitude of the drive shaft when the vibrating direction and the cutting direction are not the same as each other, the cutting depth being a difference between a position of a face to be machined of the workpiece before machining and a position of the machined face after machining in the vibrating direction; and adjusting, a movement of the tool so that the actual value becomes smaller when the actual value is larger than the command value.

\* \* \* \* \*